(12) United States Patent
VanBlon et al.

(10) Patent No.: US 10,868,844 B1
(45) Date of Patent: Dec. 15, 2020

(54) ADJUSTING AUDIO STREAM QUALITY BASED ON VOLUME

(71) Applicant: LENOVO (Singapore) PTE. LTD., New Tech Park (SG)

(72) Inventors: Russell Speight VanBlon, Raleigh, NC (US); Nathan J. Peterson, Oxford, NC (US); Mark Patrick Delaney, Raleigh, NC (US); John Carl Mese, Cary, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/573,262

(22) Filed: Sep. 17, 2019

(51) Int. Cl.
*H04R 29/00* (2006.01)
*G06F 3/16* (2006.01)
*H04L 29/06* (2006.01)

(52) U.S. Cl.
CPC .......... *H04L 65/4092* (2013.01); *G06F 3/165* (2013.01); *H04L 65/602* (2013.01); *H04R 29/001* (2013.01)

(58) Field of Classification Search
CPC . H04R 3/00; H04R 3/04; H04R 29/00; H04R 29/001; G06F 3/16; G06F 3/165; H04L 65/4069; H04L 65/4092; H04L 65/602
See application file for complete search history.

(56) References Cited

U.S. PATENT DOCUMENTS

| | | | | |
|---|---|---|---|---|
| 3,418,580 A | * | 12/1968 | Brooks | H04B 1/66 455/109 |
| 7,764,796 B2 | * | 7/2010 | Lechner | H03G 9/005 381/103 |
| 2005/0278165 A1 | * | 12/2005 | Boillot | G10K 15/04 704/200.1 |
| 2009/0290727 A1 | * | 11/2009 | Seefeldt | H03G 9/005 381/107 |
| 2010/0296659 A1 | * | 11/2010 | Tanaka | H04R 3/04 381/57 |
| 2012/0313708 A1 | * | 12/2012 | Lavasani | H03G 5/22 330/278 |
| 2015/0095489 A1 | * | 4/2015 | Makida | H04L 67/1097 709/224 |
| 2015/0281357 A1 | * | 10/2015 | Makida | H04L 67/1097 709/226 |
| 2016/0043699 A1 | * | 2/2016 | Sawa | H04R 3/005 381/57 |
| 2016/0170650 A1 | * | 6/2016 | Yamauchi | G06F 3/0653 711/154 |
| 2017/0111739 A1 | * | 4/2017 | Lan | G06F 3/165 |
| 2018/0260188 A1 | * | 9/2018 | Rossbacher | H03G 3/02 |

* cited by examiner

*Primary Examiner* — Thang V Tran
(74) *Attorney, Agent, or Firm* — Kunzler Bean & Adamson

(57) ABSTRACT

For adjusting audio streaming bandwidth based on volume, a processor detects a low-volume condition for streaming audio. In response to detecting the low-volume condition, the processor communicates a request for reduced bandwidth for the streaming audio.

18 Claims, 6 Drawing Sheets

ADJUSTING AUDIO STREAM QUALITY BASED ON VOLUME

FIELD

The subject matter disclosed herein relates to audio stream quality and more particularly relates to adjusting audio stream quality based on volume.

BACKGROUND

Full bandwidth audio streaming may require significant bandwidth.

BRIEF SUMMARY

An apparatus for adjusting audio streaming bandwidth based on volume is disclosed. The apparatus includes a speaker, a processor, and a memory that stores code executable by the processor. The processor detects a low-volume condition for streaming audio via the speaker. In response to detecting the low-volume condition, the processor communicates a request for reduced bandwidth for the streaming audio. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
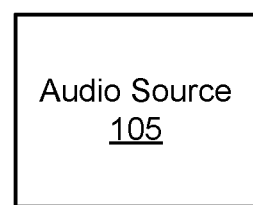
FIG. 1 is a schematic block diagram illustrating one embodiment of a streaming system.
Figure 1:
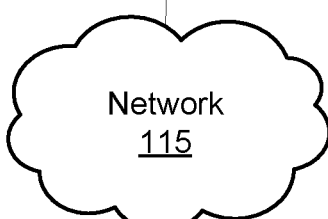
Figure 1:
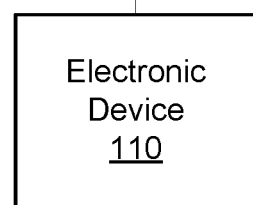

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a streaming system 100. The system 100 may adjust streaming audio 120 based on volume. In the depicted embodiment, the system 100 includes an audio source 105, a network 115, and an electronic device 110. The audio source 105 may communicate the streaming audio 120 through the network 115 to the electronic device 110. The network 115 may be a mobile telephone network, a Wi-Fi network, a Bluetooth network, a wide-area network, a local area network, or combinations thereof.

In the past, the audio source 105 has communicated the streaming audio 120 using bandwidths acceptable for high-fidelity listening. However, when the streaming audio 120 is being listened to at a low volume, a lower fidelity supported by a reduced bandwidth is typically indistinguishable from the high-fidelity/high-bandwidth streaming audio 120. The embodiments described herein detect a low-volume condition for the streaming audio 120 and communicate a request for reduced bandwidth for the streaming audio 120. As a result, the bandwidth cost of the low-volume streaming audio 120 is reduced without reducing the user's listening experience.

Figure 2:
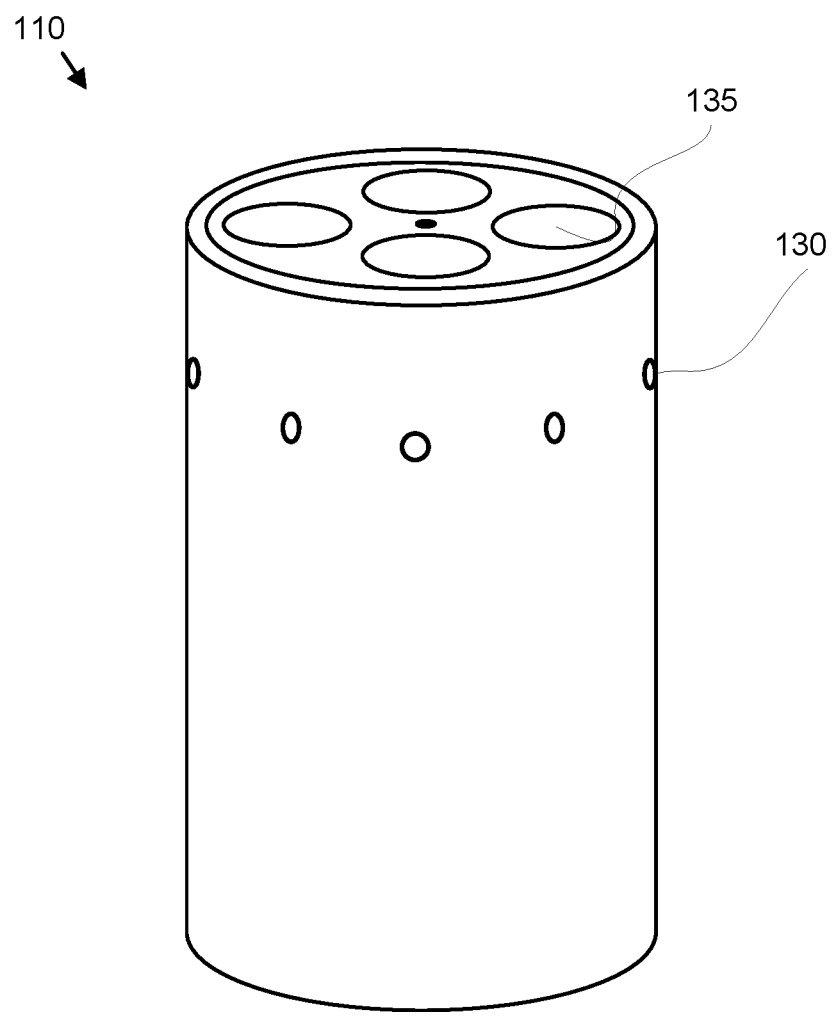
FIG. 2 is a perspective drawing illustrating one embodiment of an electronic device.

FIG. 2 is a perspective drawing illustrating one embodiment of an electronic device 110. The electronic device 110 may include at least one speaker 135. In addition, the electronic device 110 may include at least one microphone 130. The electronic device 110 may stream the streaming audio 120 through the speaker 135.

Figure 3A:
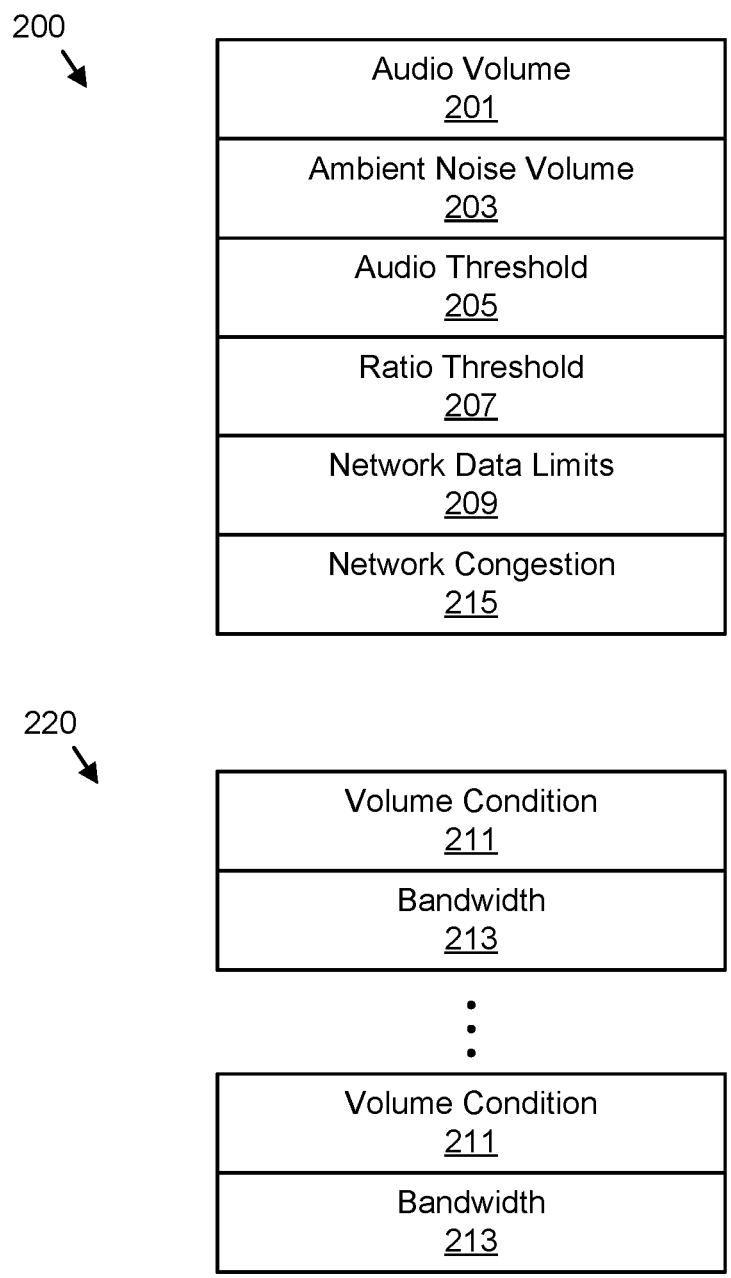
FIG. 3A is a schematic block diagram illustrating one embodiment of a streaming data.

FIG. 3A is a schematic block diagram illustrating one embodiment of a streaming data 200 and volume condition data 220. The streaming data 200 and/or the volume condition data 220 maybe organized as a data structure in a memory. In the depicted embodiment, the streaming data 200 includes an audio volume 201, an ambient noise volume 203, an audio threshold 205, a ratio threshold 207, network data limits 209, and network congestion 215. The volume condition data 220 may include one or more a volume conditions 211 and corresponding bandwidths 213.

The audio volume 201 may record the volume of the streaming audio 120. The volume may be measured in decibels (dB). The ambient noise volume 203 may record a volume of ambient noise around the electronic device 110. In one embodiment, the ambient noise volume 203 is measured by the microphone 130. The microphone may measure audio volume 201 and/or the ambient noise volume 203 during a lull or silence in the streaming audio 120. The ambient noise volume 203 may be measured in dB.

The audio threshold 205 may be used to determine when the volume condition 211 is satisfied. In one embodiment, the volume condition 211 is satisfied in response to the audio volume 201 being below the audio threshold 205. In a certain embodiment, the audio threshold 205 is less than 45 dB. In an alternate embodiment, the volume condition 211 is satisfied in response to the audio volume 201 being above the audio threshold 205. In a certain embodiment, the audio threshold 205 is less than 85 dB.

The ratio threshold 207 may be used to determine when the volume condition 211 is satisfied. In a certain embodiment, the volume condition 211 is satisfied in response to a ratio of the audio volume 201 to ambient noise volume 203 being below the ratio threshold 207. The ratio threshold may be less than 1.5.

The network data limits 209 may specify a limit on data transfers for a specified time interval such as a day or a month. In addition, the network data limits 209 a record cumulative data transfers for the specified time interval.

The network congestion 215 may specify a percentage of the network bandwidth that is currently being used (used network bandwidth percentage). In addition, the network congestion 215 may specify a percentage of the network bandwidth that is currently being used by the streaming audio 120 (audio network bandwidth percentage).

In one embodiment, the audio threshold 205 is modified as a function of network data limits 209 and/or network congestion 215. The audio threshold AT 205 may be modified using Equation 1, wherein MAT is a modified audio threshold 205, CDT is a cumulative data transfer, DTL is a data transfer limit, and k is a nonzero constant. In a certain embodiment, k is in the range of 1.2 to 2.

$$MAT=k(CDT/DTL)AT \qquad \text{Equation 1}$$

The audio threshold AT 205 may further be modified using Equation 2, wherein UNB is the used network bandwidth percentage, ANB is the audio network bandwidth percentage, and l is a nonzero constant. In a certain embodiment, l is in the range of 1.1 to 3.

$$MAT=l(\sqrt{UNB}+ANB)AT \qquad \text{Equation 2}$$

In one embodiment, the audio threshold 205 is modified as a function of both Equation 1 and Equation 2, wherein k is in the range of 1.05 to 1.3 and l is in the range of 0.9 to 1.8, as shown in Equation 3.

$$MAT=(k(CDT/DTL)+l(\sqrt{UNB}+ANB))AT \qquad \text{Equation 3}$$

The ratio threshold 207 may be modified as a function of the network data limits 209 and/or the network congestion 215. The ratio threshold RT 207 may be for modified using Equation 4, where MRT is the modified racial threshold 207 and k is in the range of 1.6 to 4.

$$MRT=k(CDT/DTL)RT \qquad \text{Equation 4}$$

In addition, the ratio threshold 207 may be modified using Equation 5, wherein l is in the range of 2 to 4.

$$MRT=l(\sqrt{UNB}+ANB)RT \qquad \text{Equation 5}$$

In a certain embodiment, the ratio threshold 207 is modified using Equation 6 wherein k is in the range of 1.4 to 2.8 and l is in the range of 1.5 to 3.

$$MRT=(k(CDT/DTL)+l(\sqrt{UNB}+ANB))RT \qquad \text{Equation 6}$$

In one embodiment, each volume condition 211 includes a set of streaming data 200. Alternatively, each volume condition 211 may include a portion of the streaming data 200. The corresponding reduced bandwidth 213 may specify the bit rate for the streaming audio 120 such as 32 kilobits/second (kbs), 64 kbs, or 128 kbs if the volume condition 211 is satisfied.

The reduced bandwidth 213 may be determined based on the network congestion 215. In one embodiment, the reduced bandwidth 213 is determined using Equation 7, where BR is a current bit rate, RBR is the requested bit rate for the reduced bandwidth 213, and l is in the range of 0.8 to 1.2.

$$RBR=l(\sqrt{UNB}+ANB)BR \qquad \text{Equation 7}$$

The reduced bandwidth 213 may also be determined based on the network data limits 209. In a certain embodiment, the reduced bandwidth 213 is determined using Equation 8, where k is in the range of 0.8 to 1.2

$$RBR=k(CDT/DTL)RT \qquad \text{Equation 8}$$

Figure 3B:
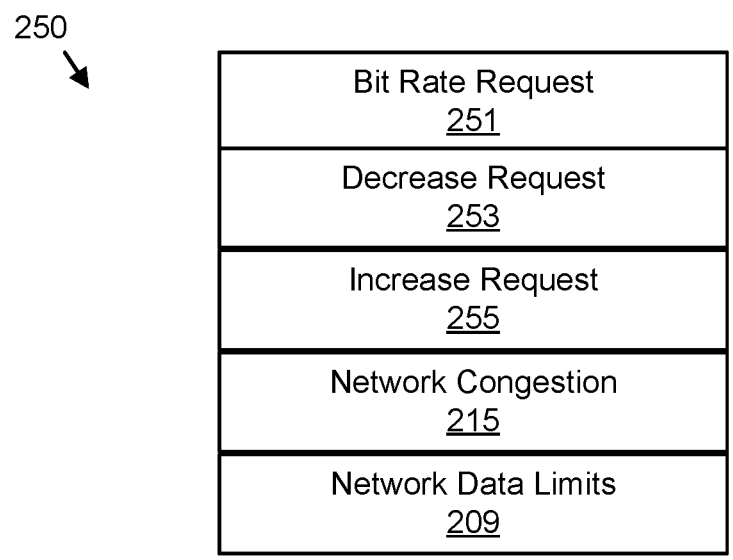
FIG. 3B is a schematic block diagram illustrating one embodiment of request data.

FIG. 3B is a schematic block diagram illustrating one embodiment of a request 250. The request 250 maybe organized as a data structure in a memory and/or communicated via a packet to the audio source 105. In one embodiment, only a portion of the request 250 is communicated to the audio source 105. In the depicted embodiment, the request 250 includes a bit rate request 251, a decrease request 253, an increase request 255, the network congestion 215, and the network data limits 209.

The bit rate request 251 may specify a bit rate for a reduced bandwidth 213 from the audio source 105. The bit rate request 251 may be used to request a specified reduced bandwidth 213. For example, the bit rate request 251 may be used to request 64 kbs for the streaming audio 120.

The decrease request 253 may request that the audio source 105 reduce the bandwidth of the streaming audio to an unspecified bit rate. For example, if the current bit rate for the streaming audio 120 is 128 kbs, the decrease request 253 may result in the audio source 105 communicating the streaming audio 120 at either 32 kbs or 64 kbs. In a certain embodiment, the audio source 105 may select the bit rate based on the network congestion 215 and/or the network data limits 209 using any of Equations 1-8.

Figure 4:
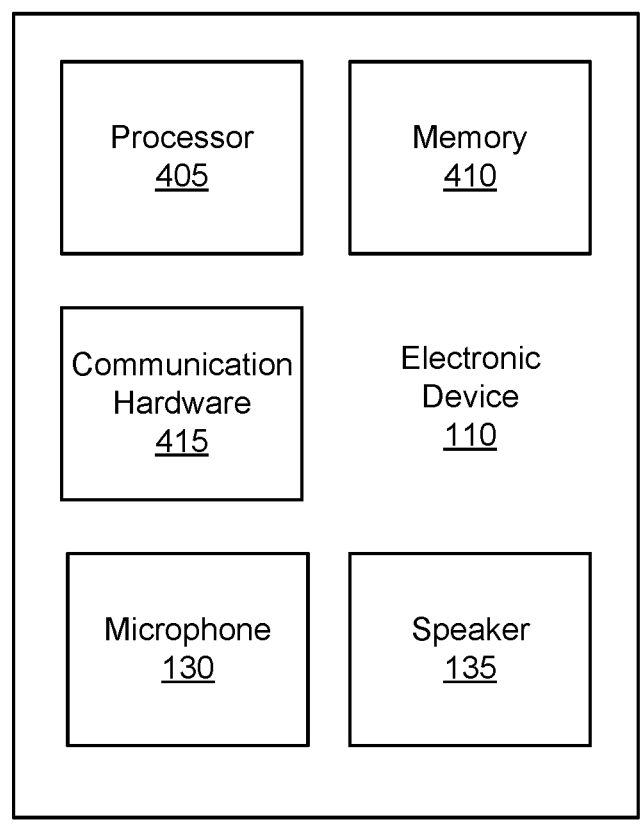
FIG. 4 is a schematic block diagram illustrating one embodiment of an electronic device.

FIG. 4 is a schematic block diagram illustrating one embodiment of the electronic device 110. In the depicted embodiment, the electronic device 110 includes a processor 405, a memory 410, communication hardware 415, the microphone 130, and the speaker 135. The memory 410 may include a semiconductor storage device, a hard disk drive, or combinations thereof. The memory 410 may store code. The processor 405 may execute the code. The communication hardware 415 may communicate with the network 115, the microphone 130, and/or the speaker 135.

Figure 5:
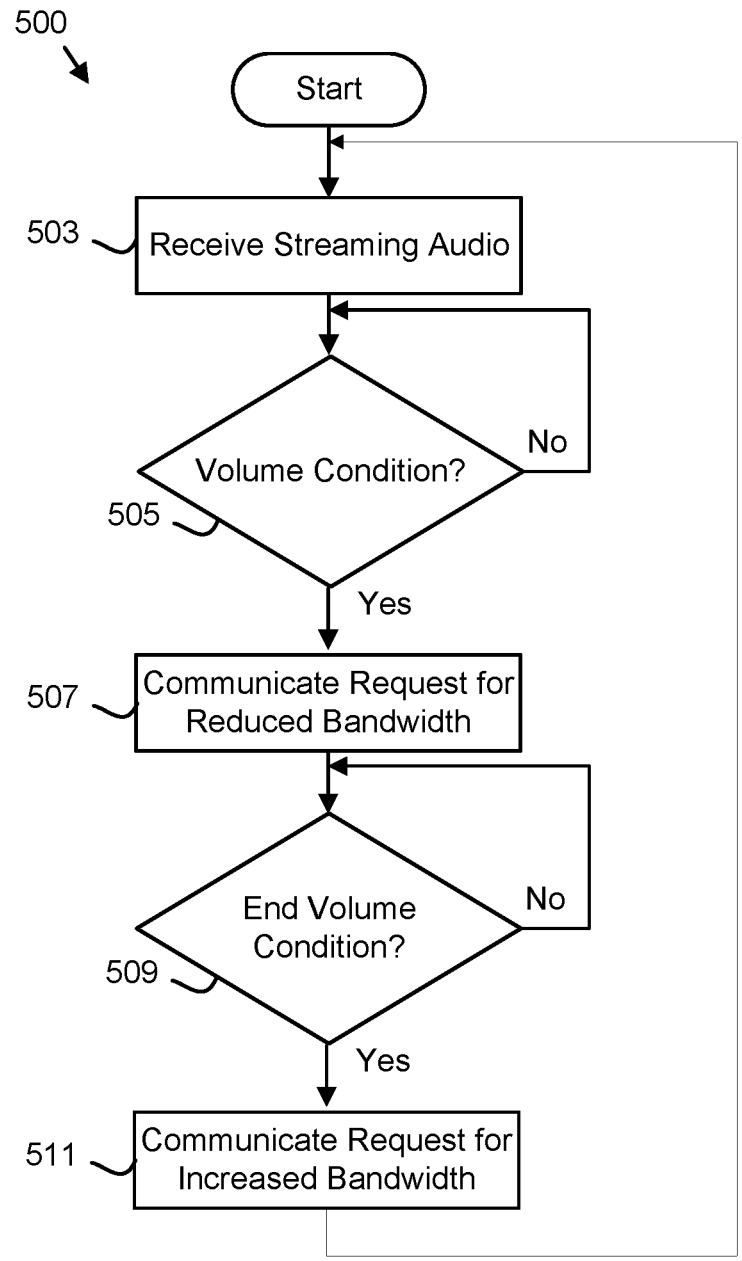
FIG. 5 is a schematic flow chart diagram illustrating one embodiment of a bandwidth adjustment method.

FIG. 5 is a schematic flow chart diagram illustrating one embodiment of a bandwidth adjustment method 500. The method 500 may communicate a request for reduced bandwidth and/or increased bandwidth based on the volume condition 211. The method 500 may be performed by the processor 405.

The method 500 starts, and in one embodiment, the processor 405 receives 503 the streaming audio 120. The streaming audio 120 may be received 503 at a first bit rate using a first bandwidth of a network bandwidth.

The processor 405 may detect 505 the volume condition 211 for the streaming audio 120. In a certain embodiment, the processor 405 detects 505 the volume condition 211 being satisfied for the streaming audio 120. The volume condition 211 may be a low-volume condition 211. The low-volume condition 211 may be satisfied in response to the audio volume 201 being below the audio threshold 205. The audio threshold 205 may be modified as a function of the network data limits 209 and/or the network congestion 215. Alternatively, the volume condition 211 may be a high-volume condition 211. The high-volume condition 211 may be satisfied in response to the audio volume 201 being above the audio threshold 205. For example, if the volume is so high that distortion reduces quality, the volume condition 211 may be satisfied.

In addition, the volume condition 211 may be satisfied in response to a ratio of the audio volume 201 to ambient noise volume 203 being below the ratio threshold 207. The ratio threshold 207 may be modified as a function of the network data limits 209 and/or the network congestion 215. In one embodiment, the processor 405 detects 505 one or more of the volume conditions 211 being satisfied.

If the processor 405 does not detect 505 the volume condition 211, the processor 405 continues to monitor for the volume condition 211. In response to detecting 505 the volume condition 211, the processor 405 communicates 507 the request 250 for reduced bandwidth 213 for the streaming audio 120. The request 250 may be communicated to the audio source 105. The request 250 may include the bit rate request 251 for a specified decreased bit rate. In addition, the request 250 may include the decrease request 253 for a decreased bit rate and/or decreased bandwidth 213. The audio source 105 may modify the bit rate and/or bandwidth 213 of the streaming audio 120 in response to the request 250.

The processor 405 may further detect 509 an end of the volume condition 211. The end of the volume condition 211 may be detected 509 in response to the volume condition 211 not been satisfied. The processor 405 may detect 509 an end of one or more of the volume conditions 211.

If the end of the volume condition 211 is not detected, the processor 405 continues to monitor for the end of the volume condition 211. In response to detecting the end of the volume condition 211, the processor 405 communicates 511 the request 250 for increased bandwidth. The request 250 may include a bit rate request 251 for a specified increased bit rate. In addition, the request 250 may include the increase request 255 for an increased bit rate and/or increased bandwidth 213. The audio source 105 may modify the bit rate and/or bandwidth 213 of the streaming audio 120 in response to the request 250.

The embodiments detect the volume condition 211 for the streaming audio 120 and communicate the request 250 for the reduced bandwidth 213 for the streaming audio 120. As a result, the bandwidth 213 is reduced, allowing the audio source 105, the network 115, and the electronic device 110 to operate more efficiently with minimal impact to the audio quality for the user. Thus the embodiments improve the efficiency of the electronic device 110, the network 115, and/or the audio source 105.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a speaker;
   a processor;
   a memory that stores code executable by the processor to:
   detect a low-volume condition for streaming audio from an audio source via the speaker, wherein the low-volume condition is detected in response to audio volume being below an audio threshold; and
   in response to detecting the low-volume condition, communicate to the audio source a request for reduced bandwidth for the streaming audio.

2. The apparatus of claim 1, wherein the code is further executable by the processor to:
   detect an end of the low-volume condition; and
   in response to detecting the end of the low-volume condition, communicate a request for increased bandwidth for the streaming audio.

3. The apparatus of claim 1, wherein the audio threshold is modified as a function of network data limits and/or network congestion.

4. The apparatus of claim 1, wherein the low-volume condition is further satisfied in response to a ratio of the audio volume to ambient noise volume being below a ratio threshold.

5. The apparatus of claim 4, wherein the ratio threshold is modified as a function of network data limits and/or network congestion.

6. The apparatus of claim 1, wherein the reduced bandwidth is determined based on network congestion.

7. The method of claim 1, wherein the reduced bandwidth is determined based on network data limits.

8. The apparatus of claim 1, wherein the low-income condition is one of a plurality of low-volume conditions that each correspond to a reduced bandwidth.

9. A method comprising:
   detecting, by use of a processor, a low-volume condition for streaming audio from an audio source, wherein the low-volume condition is detected in response to audio volume being below an audio threshold; and
   in response to detecting the low-volume condition, communicating to the audio source a request for reduced bandwidth for the streaming audio.

10. The method of claim 9, the method further comprising:
    detecting an end of the low-volume condition; and
    in response to detecting the end of the low-volume condition, communicating a request for increased bandwidth for the streaming audio.

11. The method of claim 9, wherein the audio threshold is modified as a function of network data limits and/or network congestion.

12. The method of claim 9, wherein the low-volume condition is further satisfied in response to a ratio of the audio volume to ambient noise volume being below a ratio threshold.

13. The method of claim 12, wherein the ratio threshold is modified as a function of network data limits and/or network congestion.

14. The method of claim 9, wherein the reduced bandwidth is determined based on network congestion.

15. The method of claim 9, wherein the reduced bandwidth is determined based on network data limits.

16. The method of claim 9, wherein the low-volume condition is on of a plurality of low-volume conditions that each correspond to a reduced bandwidth.

17. A program product comprising a non-transitory computer readable storage medium that stores code executable by a processor, the executable code comprising code to:
   detect a low-volume condition for streaming audio from an audio source, wherein the low-volume condition is detected in response to audio volume being below an audio threshold; and
   in response to detecting the low-volume condition, communicate to the audio source a request for reduced bandwidth for the streaming audio.

18. The program product of claim 17, wherein the code is further executable by the processor to:
   detect an end of the low-volume condition; and
   in response to detecting the end of the low-volume condition, communicate a request for increased bandwidth for the streaming audio.

* * * * *